(12) United States Patent  (10) Patent No.: US 7,517,100 B2
Englander et al.  (45) Date of Patent: Apr. 14, 2009

(54) ASYMMETRIC MULTIPLE CONSTANT RADII OF CURVATURE CONVEX MIRRORS

(75) Inventors: Benjamin Englander, Jamaica, NY (US); Julian Serer, Jamaica, NY (US)

(73) Assignee: Rosco Inc., Jamaica, NY (US)

( * ) Notice: Subject to any disclaimer, the term of this patent is extended or adjusted under 35 U.S.C. 154(b) by 0 days.

(21) Appl. No.: 11/619,410

(22) Filed: Jan. 3, 2007

(65) Prior Publication Data

US 2008/0100938 A1 May 1, 2008

Related U.S. Application Data

(60) Provisional application No. 60/855,779, filed on Nov. 1, 2006.

(51) Int. Cl.
G02B 5/10 (2006.01)
B60R 1/06 (2006.01)

(52) U.S. Cl. ........................ 359/868; 359/851

(58) Field of Classification Search ................. 359/851, 359/866, 868
See application file for complete search history.

(56) References Cited

U.S. PATENT DOCUMENTS

| | | | | |
|---|---|---|---|---|
| 1,768,354 A | * | 6/1930 | Falge | 359/608 |
| 2,455,919 A | * | 12/1948 | Daon | 248/482 |
| 2,857,810 A | * | 10/1958 | Troendle | 359/868 |
| 3,003,396 A | * | 10/1961 | Jenkins | 359/868 |
| 4,436,372 A | | 3/1984 | Schmidt et al. | |
| 4,580,881 A | * | 4/1986 | Kim | 359/868 |
| 4,730,914 A | | 3/1988 | Stout | |
| 4,730,926 A | * | 3/1988 | Wedemeyer | 356/138 |
| 4,822,157 A | | 4/1989 | Stout | |
| 4,938,578 A | * | 7/1990 | Schmidt et al. | 359/868 |
| 5,005,963 A | * | 4/1991 | Schmidt et al. | 359/868 |
| 5,084,785 A | | 1/1992 | Albers et al. | |
| D346,357 S | | 4/1994 | Englander | |
| 5,307,211 A | * | 4/1994 | Schmidt et al. | 359/868 |
| 5,589,984 A | | 12/1996 | Schmidt et al. | |
| 6,015,215 A | * | 1/2000 | Herman | 359/864 |
| 6,069,755 A | * | 5/2000 | Li | 359/868 |
| 6,227,674 B1 | | 5/2001 | Englander | |
| 6,282,771 B2 | | 9/2001 | Englander | |
| 6,328,450 B2 | | 12/2001 | Englander | |
| 7,012,761 B1 | * | 3/2006 | Schmidt et al. | 359/708 |
| 7,134,759 B2 | | 11/2006 | Schmidt et al. | |
| 7,172,301 B2 | * | 2/2007 | Ito | 359/868 |
| 2002/0089753 A1 | * | 7/2002 | Englander | 359/603 |
| 2002/0159169 A1 | * | 10/2002 | McCord | 359/868 |
| 2005/0161573 A1 | | 7/2005 | Schmidt et al. | |

(Continued)

FOREIGN PATENT DOCUMENTS

GB 2293151 * 3/1996

(Continued)

Primary Examiner—Ricky D Shafer
(74) Attorney, Agent, or Firm—Irah H. Donner; Wilmer Cutler Pickering Hale & Dorr LLP

(57) ABSTRACT

An asymmetrical mirror lens, usable on front fenders of school buses and similar vehicles, which has a plurality of mirror sections, each having a distinct constant radius of curvature to reduce image distortion. Optional sections located between sections of the constant radius of curvature have a step-wise changing radii of curvature to smooth the image sizes as an object moves across the mirror lens.

16 Claims, 12 Drawing Sheets

| U.S. PATENT DOCUMENTS | | | | JP | 08-188088 | * | 7/1996 |
|---|---|---|---|---|---|---|---|
| 2005/0180034 A1 | 8/2005 | Schmidt et al. | | JP | 09-76821 | * | 3/1997 |
| 2007/0030582 A1 * | 2/2007 | Schmidt ..................... 359/868 | | | | | |

FOREIGN PATENT DOCUMENTS

| JP | 57-186553 | * | 11/1982 |
|---|---|---|---|

* cited by examiner

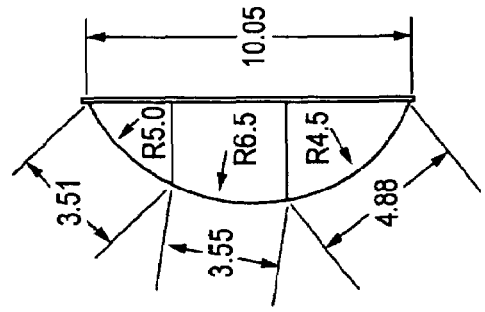
FIG. 1b1
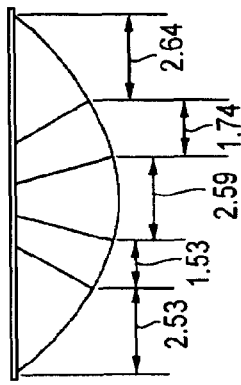
FIG. 1a1
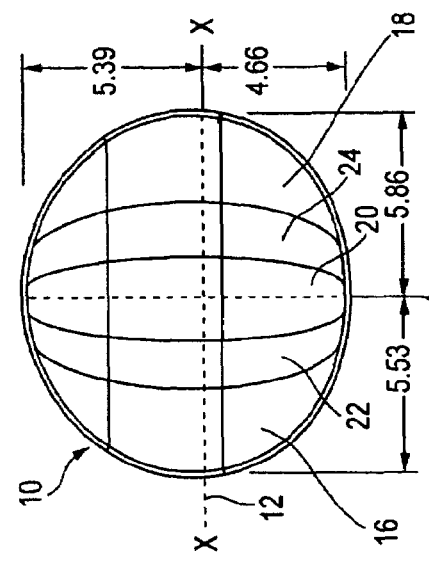
FIG. 1
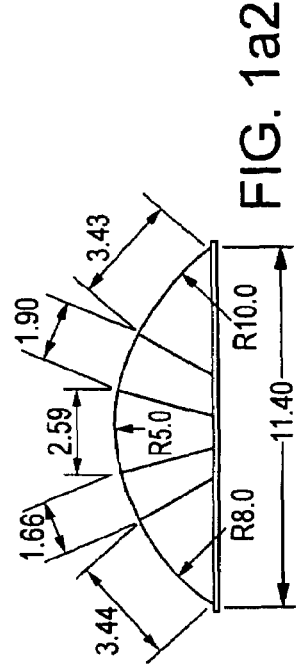
FIG. 1a2
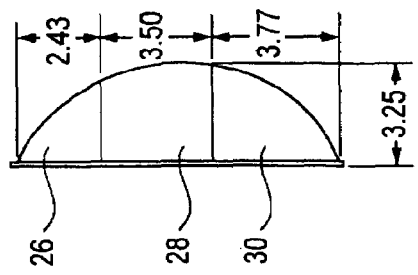
FIG. 1b2

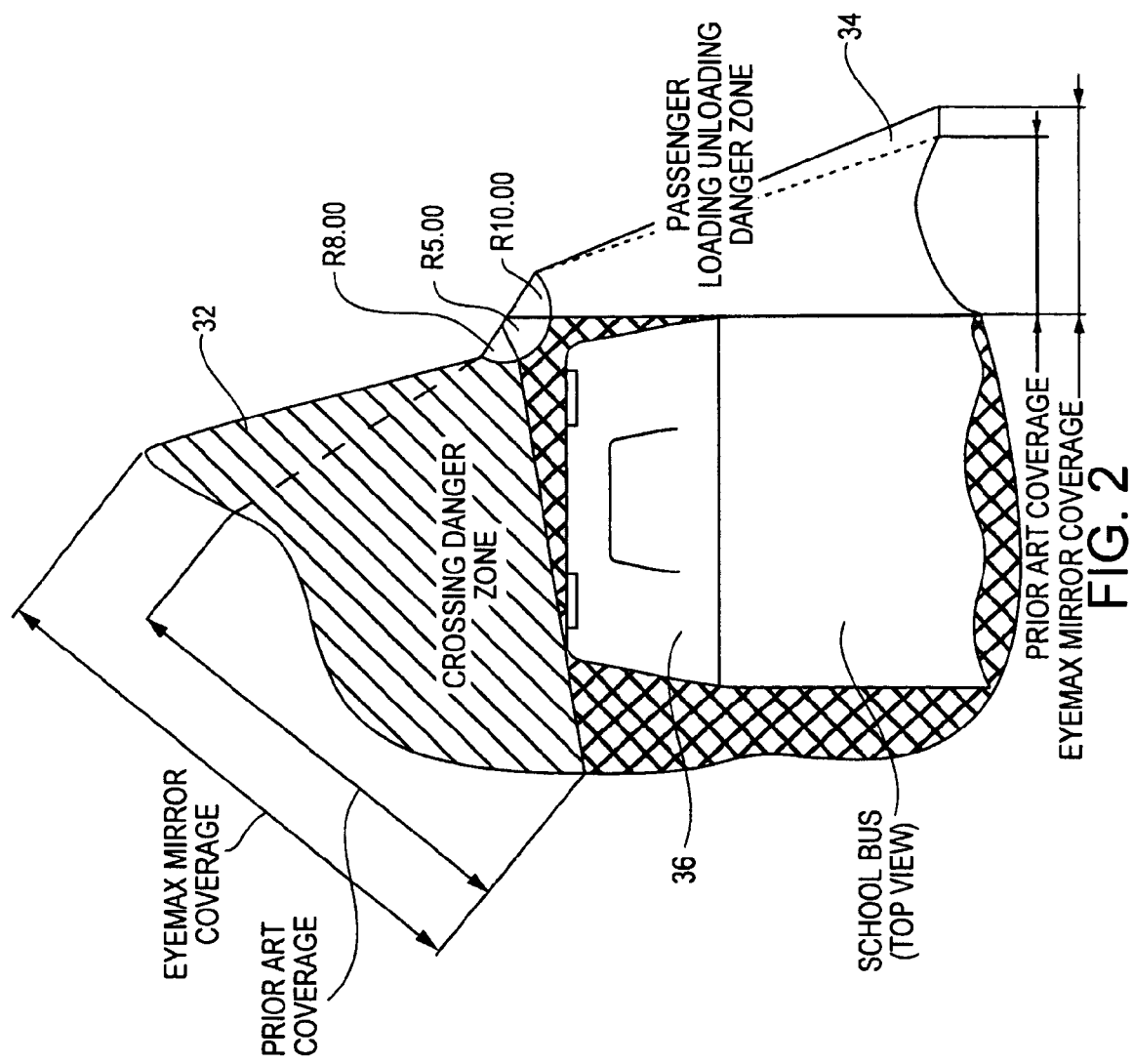

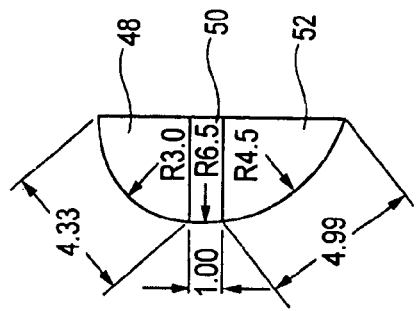
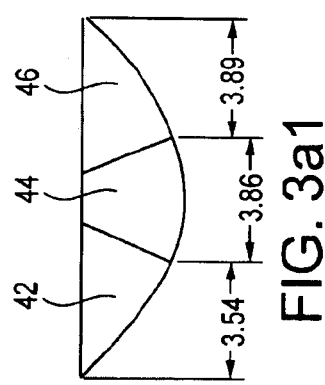
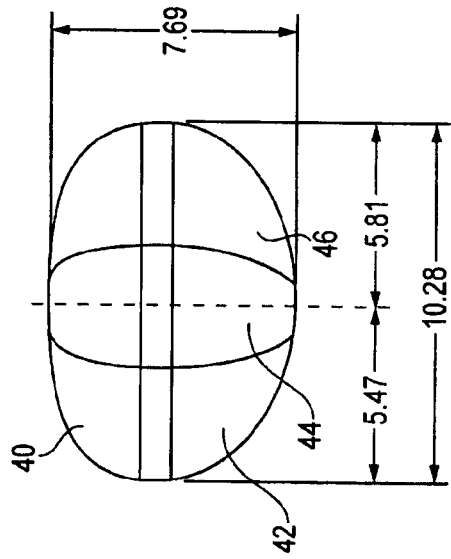
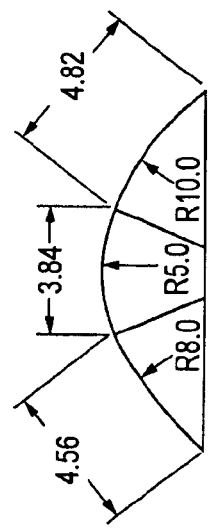
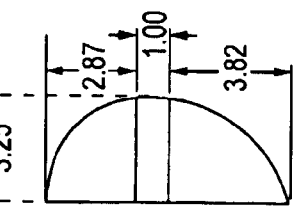

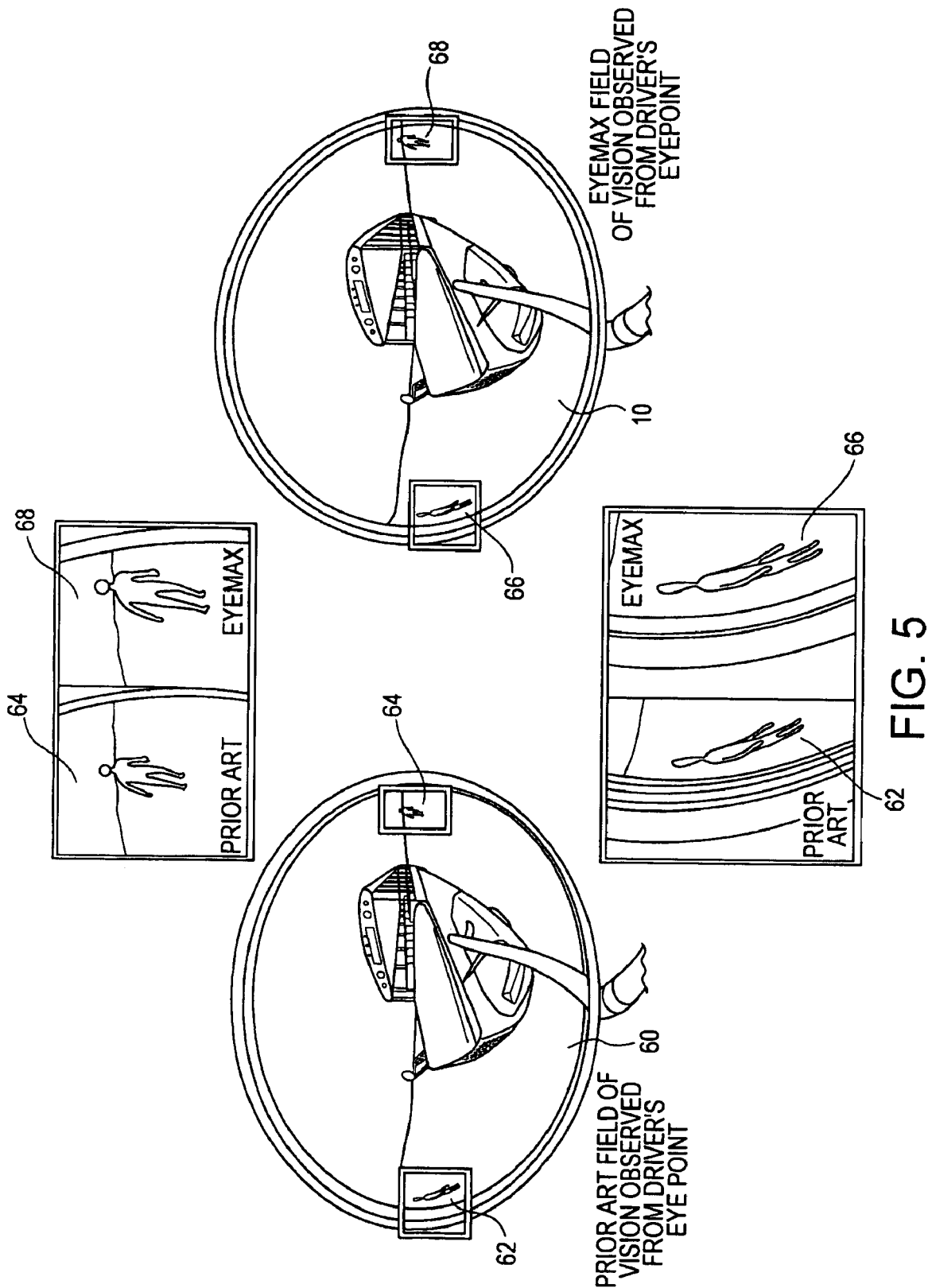

ASYMMETRIC MULTIPLE CONSTANT RADII OF CURVATURE CONVEX MIRRORS

CROSS-REFERENCE TO RELATED APPLICATION

The present application claims benefit of and priority to U.S. Provisional Patent Application No. 60/855,779 entitled ASYMMETRIC MULTIPLE CONSTANT RADII OF CURVATURE CONVEX MIRRORS filed Nov. 1, 2006, the entire contents of which are hereby incorporated by reference herein.

BACKGROUND OF THE INVENTION

This disclosure generally relates to convex, three dimensional mirrors and, more particularly, to a mirror, sometimes referred to as a "cross-over" or "cross-view" mirror, which affords a bus driver, for example, a school bus driver, visual access in front of, as well as alongside the bus. Such crossover mirrors can however also be used at the rear or front corners of other vehicles such as with trucks, mail vans and the like. More specifically, the present disclosure relates to non-ellipsoidal, asymmetric cross-view mirrors which are optimized to produce more distinct images of objects located in front of or alongside a school bus or similar vehicle.

For many decades, cross-over mirrors and mirror assemblies have been deployed on school buses, and are in fact required by federal and local regulations. A substantial body of prior art has been published describing various mirrors of the type to which the present invention relates. A sample list of such prior art mirrors include U.S. Pat. Nos. 4,822,157; 4,730,914; 4,436,372; 5,084,785; Des. 346,357; 5,589,984; 6,282,771; 6,328,450; and 6,227,674. The above list represents but a fraction of the extensive prior art on the subject of cross-over mirrors and their accessories such as mounting hardware, mirror arms and other implements by which such mirror assemblies are secured to vehicles such as busses, school buses, trucks and the like. The contents of the aforementioned United States patents are incorporated by reference herein.

The convex, three-dimensional surface of the mirror lens described, for example, in the aforementioned U.S. Pat. No. 4,436,372, terminates in a continuous, peripheral edge that lies in a 2-dimensional plane and defines, essentially, a circle. Other similar mirrors also have generally ellipsoidal or convex, i.e. dome, lens surface shapes, such that trace lines drawn over the mirror surface which pass through its center, i.e., apex, have non-constant radii of curvature.

In more recent years, the prior art has moved to provide convex, three dimensional mirror lens surfaces that have a more horizontally stretched, elongate general shapes. The aforementioned U.S. Pat. Nos. 4,822,157; 4,730,914; 4,436,372; 5,084,785; Des. 346,357; 5,589,984; 6,282,771; 6,328,450; and 6,227,674 illustrate the general style of such mirrors.

Rosco, Inc., the assignee of the present application, has introduced to the trade a novel, stretched and elgonate crossview mirror which became known in the industry as the Rosco "oval" mirror. The aforementioned Des. 346,357 and such further Rosco patents as the U.S. Pat. Nos. 6,227,674, 6,282, 771 and 6,328,450 illustrate such oval mirrors. As with many of these cross-view mirrors, the oval mirrors terminate in a continuous, peripheral edge which defines the two-dimensional, elliptical, or "oval" periphery, i.e., footprint, of the mirror lens.

Other than in the last mentioned three patents of the instant assignee, the prior art three dimensional, generally ellipsoidal or convex surfaces of the aforementioned elongate cross-over mirror lenses have been characterized by radii of curvature (measured along planar cross-sections on the major and minor axes) which were distinctly non-constant, i.e. tending to increase or decrease on the mirror lens toward or adjacent its peripheral, circumferential edge.

As an example, the convex, ellipsoid mirror lens shown in U.S. Pat. No. 4,436,372 has a generally flatter, i.e. less curved, center surface, which surface curves sharper as one proceeds toward the peripheral edge. Stated differently, the "radius of curvature" of the surface decreases from the center, vertical axis (apex) of the mirror surface toward the peripheral edge of the mirror. A similar relationship is specifically claimed for the elongate, oval mirror described in the aforementioned U.S. Pat. No. 5,589,984.

But in another patent, i.e., the U.S. Pat. No. 5,084,785 to Albers, an opposite relationship is specified—the sharpest curvature, i.e., smallest radius of curvature, is at the center, and the mirror surface flattens out as one proceeds toward the peripheral edge. In other words, the mirror lens exhibits an increasing radius of curvature, along the major axis.

One school of prior art thought actually adheres to the notion that it is desirable to vary the radius of curvature, to obtain larger and less distorted images at the mirror center, and smaller, but more distorted, images, at the peripheral regions on the mirror. The idea is to increase the field of view that the mirror monitors in and around the school bus.

Further research and insight gained by the instant inventors relative to cross-view mirrors has revealed drawbacks that are still incorporated in the prior art cross-view mirrors and advantages that can be gained from improved, very careful shaping of the convex structure of the mirror lens reflecting surfaces. For example, it would be advantageous to reduce the size of the "footprint" of the mirror without reducing the field of view. A decreased mirror foot print size reduces the size of the forward looking blind spot of the mirror in front of the vehicle, improves the mirror's aerodynamic performance, the aesthetics of the vehicle, and also results in reduced mirror weight and reduced cost of mounting the mirror assembly to a vehicle. Alternatively, the size may be maintained as in the prior art, while obtaining the benefit of increased image sizes, particularly of students standing several feet in front of and far away adjacent the rear wheels of the school bus.

Furthermore, in general, a cross-view mirror is intended to provide a field of view both in front and alongside the bus. However, the size and general shape of the monitored area in front of a school bus, differs from that which needs to be monitored alongside the bus. That is, school buses and similar vehicles have comparative lengths several times larger than the widths of the vehicles. The image of a child standing alongside a school bus near the rear wheels needs to be sufficiently large to afford the driver a good view of a child who may stoop low or fallen or slipped under or too close to the school bus. At the front of the bus, it is more important to assure that the entire width and several feet in front of the bus are clearly visible. In other words, the field of view characteristics in front of the school bus and alongside differ from one another. Prior art mirrors have not been optimized to fully accommodate these differences.

Rather, all prior art mirrors, including those that have horizontally stretched bodies, are widthwise symmetrical with respect to their generally vertical mounting axis. Thus, the mirror surface size and shape and field of view to the right of the axis is identical to the mirror surface and view to the left of the axis. Therefore, both sides of the lens provide the same image reflecting characteristics at the left mirror side, which is primarily focused on the area in front of the bus, as at the right mirror side which focuses images from alongside the bus (for a mirror mounted to the right of the driver).

Another concern of the instant inventors is based on the understanding that prior art mirrors, such as the mirrors described in the aforementioned U.S. Pat. Nos. 5,589,984 and 4,436,372, have varying radii of curvature resulting in continually changing image sizes, along the surfaces of the mirror. This makes it more difficult for the driver to follow and carefully monitor the movements of a child alongside or in front of the school bus.

SUMMARY OF THE DISCLOSURE

It is an object of the present invention to overcome the aforementioned drawbacks of the prior art and to provide cross-view mirror lenses which generally increase the sizes and improve the definitions of images of children milling about either the front or alongside regions of the school bus. The features of the mirror or mirrors described below are not "required," but are rather characteristics that may be part of the novel mirror, the exact features and combination of elements being defined by the claims and not by this section of the disclosure.

The foregoing and other objects of the present disclosure are realized by a mirror lens that has a near circular peripheral edge, but, more precisely, a slightly stretched, oblong body characterized in that the right side of the mirror lens, relative to the vertical mounting axis (or the upper peak) of the mirror, has a substantially constant first radius of curvature, and a second substantially constant radius of curvature to the left side of the vertical axis. At the small region in and around the vertical axis, there is a small section of a constant or (optionally) very slightly changing radius of curvature. These regions of constant curvature are bridged by narrow strips of changing curvature mirror surfaces, producing a smoothly changing image size which does not distract or confuse the driver, as an image of a child passes from the right side to the left side of the mirror lens.

The convex, asymmetric lens surface shape of the mirror lens terminates in a peripheral edge which lies in a flat plane and which defines in that flat plane a closed curve which has a width and a height dimension, where the width dimension is measured along an x-axis and the height along a y-axis. The x-axis extends from the right to the left side of the mirror lens and represents the farthest aspect points on the right and left sides of the mirror. The y-axis extends from the bottom of the mirror to the top of the mirror, including its furthest apart points along the height of the mirror.

The characteristics of the convex lens are such that the distance from the y-axis to the right edge of the mirror (at the peripheral edge) is not equal to the distance from the y-axis to the left edge of the mirror, producing an asymmetric lens surface, unlike any lens surface of the prior art. Similarly, the mirror is asymmetric in the vertical direction, whereby the distance from the x-axis to the bottom edge of the mirror is different from the distance from the x-axis to the top edge of the mirror along the height direction. Optionally, the effect along the height direction is such that images which are reflected from higher elevations, such as the horizon around the bus and the flashing lights of the school bus, are rendered in smaller size, as they are less important than the images that are located closer to the ground, where the images of children milling about the bus need to be clearly discerned.

In the above described mirror lens, the radius of curvature along the x-axis (on the lens surface) is smallest at the center of the mirror lens, intermediate in value to the left of the y-axis, adjacent the perimetral edge, and largest to the right of the y-axis adjacent the perimetral edge. Each of these regions has a constant radius of curvature. These regions are joined by sections where the radius of curvature changes step-wise, to bridge the different regions of constant radii of curvature.

Proceeding vertically, the mirror lens similarly has three, sequentially constant sections of radii of curvature, which are optionally joined by regions of step-wise changing radii of curvature. In accordance with one embodiment, the radius of curvature at the top of the mirror along the y-axis is substantially smaller than the other radii of curvature, to obtain a mirror of substantially reduced height and footprint.

In accordance with other optional features of the present disclosure the peripheral shape of the mirror does not conform to any prior art shape, as the shape of the mirror's periphery need not be circular, nor oval, nor symmetric, nor conform to any known geometric shape. For example, the periphery, i.e. the closed circumference of the base, may consist of sections of constant curvature arcs that are tangent to each other. In one embodiment, there may be six sections of constant curvature and two sections that have quadratic Bezier curve characteristics. The mirror may have a peak defining its upper apogee, and a more "squat" shape at the bottom (on the opposite side of the x-axis).

As another option, the mirror may include a marking visually indicating its peak, namely apogee, and its apex, i.e., the highest point of its dome over the base, thereby assisting or enabling the driver to horizontally align the mirror. The marking can be in the form of darker tinting applied to the mirror at those locations. In addition the mirror may be tinted to reduce glare, preferably along the upper one-third horizontal sector along the y-axis. The tinting may also be applied as a strip of tint extending down along the y-axis, reaching as far down as about two-thirds of the mirror surface. The strip's width may be such that a majority of the image of the bus in the mirror is covered by darker tinting, to further improve the mirror vis-à-vis its sun or headlight glare characteristics.

Still further, the swivel ball stem typically provided at the rear back of the mirror is aligned with the horizontal geometric center of the mirror vertically down from the peak of the mirror approximately two-thirds of the way down.

Other features and advantages of the present invention will become apparent from the following description of the invention that refers to the accompanying drawings.

BRIEF DESCRIPTION OF THE DRAWINGS

FIG. 1 is a line drawing of the footprint or base of the inventive mirror lens, defining various sections of different radii of curvature on the lens surface thereof.

FIGS. 1*a*1 and 1*a*2 are cross-sections through the x-axis indicating different, but constant radii of curvature along the width of the mirror lens, with bridging regions therebetween.

FIGS. 1*b*1 and 1*b*2 are a cross-sections through the y-axis of the mirror lens showing different, but constant radii of curvature therealong.

FIG. 2 is a top view of a portion of a school bus with a mapping of the field of view of the inventive lens relative to the prior art.

FIG. 3 is a second embodiment of the invention with a modified footprint.

FIGS. 3*a*1 and 3*a*2 are cross-sections along the x-axis.

FIGS. 3*b*1 and 3*b*2 are cross-sections along the y-axis of the mirror lens of FIG. 3.

FIG. 5 illustrates actual images seen in the inventive mirror of the disclosure and comparisons of those images to prior art corresponding images.

DETAILED DESCRIPTION OF EMBODIMENTS OF THE DISCLOSURE

With reference to the drawings, the features of and a method for constructing the lens for the present disclosure, which is intended to be known as the EYEMAX mirror lens, are described below.

Construction is based on a multiple, (three) constant radii profile. The same profile is revolved three times to create three sections (slices) with different curvatures, each slice being characterized by a distinct radius of revolution. These sections are joined by intermediate sections that are characterized by having step-wise changing radii of curvature.

Figure 9A:
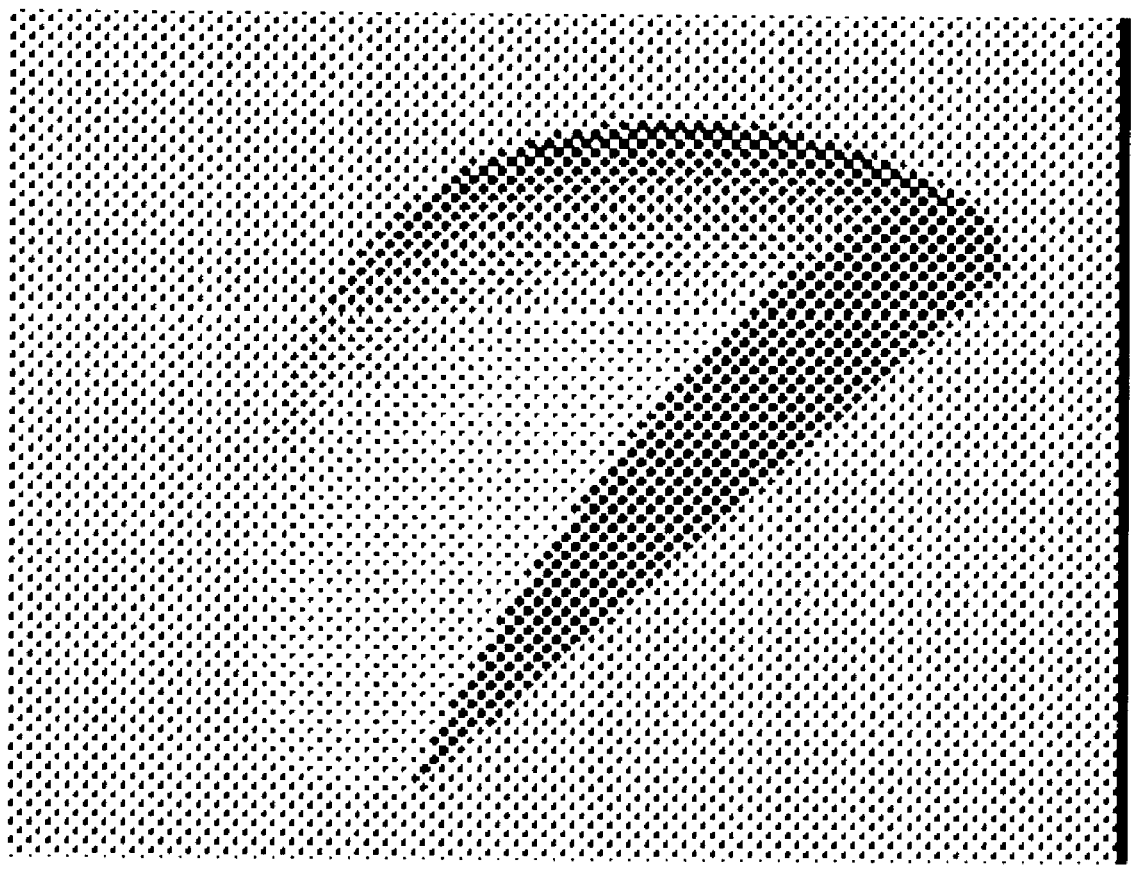
FIGS. 9a-9c are illustrations of a construction of a lens in accordance with one embodiment of the invention.

The first "slice" is created by revolving an identical profile about a given radius, e.g., R5.00", denoting a constant radius of curvature of five inches, as shown in FIG. 9a.

Figure 9B:
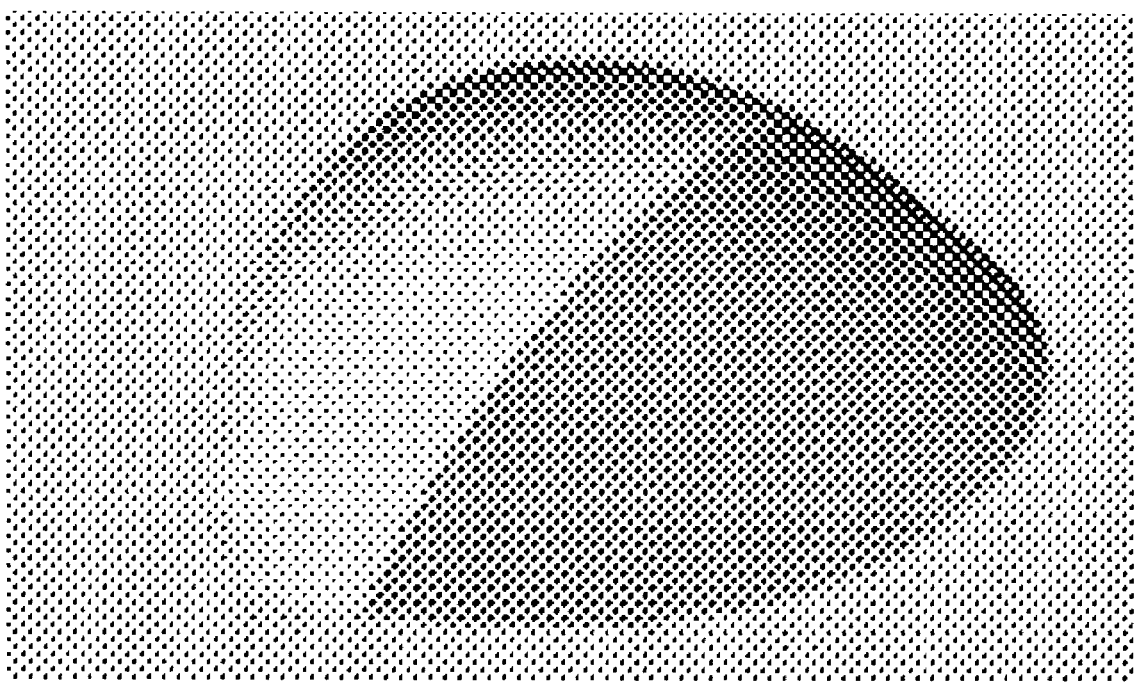

The second "slice" is created by revolving an identical profile about a radius R10.00", as shown in FIG. 9b.

Figure 9C:
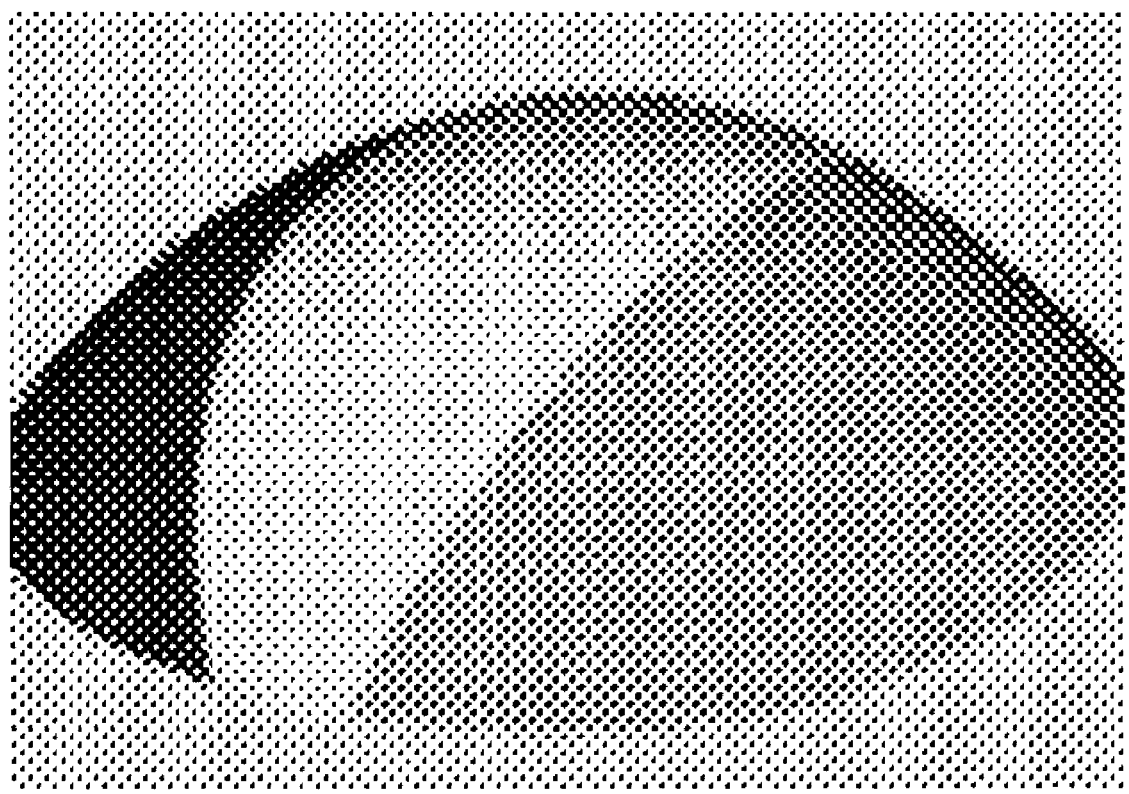

The third "slice" is created by revolving an identical profile about a radius R8.00", as shown in FIG. 9c.

All three "slices" (shown above in different shades) are joined (by the regions of changing curvature) to form a single body (dome), featuring a continuous smooth surface. Each "slice" has a different purpose as far as the field of vision (i.e., field of view) is concerned.

With reference to FIG. 1, the mirror 10 has a width, measured along the x-axis 12, of approximately 11.39 inches. The mirror is slightly asymmetrical with respect to the y-axis 14. For example, the right side may measure 5.86 inches in width and the left side 5.53 inches.

Proceeding along the height (y-axis), the mirror lens has a dimension of about 10.05 inches, with a top portion (above the x-axis) measuring 5.39 inches and a bottom portion measuring 4.66 inches.

Taking cross-sectional views along the x-axis 12, the mirror has several sections of different radii of curvature along the x-axis. Proceeding from left to right, a first section 16 has a radius of curvature of 8 inches, a central section 20 has a radius of curvature of 5 inches and a right side section 18 has a radius of curvature of 10 inches.

A left joining section 22 has radii of curvature that change, step-wise, from 8 to 5 inches of radius of curvature, in incremental steps, for example, every tenth of an inch along the x-axis. Similarly, the joining section 24 has radii of curvature that change, step-wise, from 5 to 10 inches.

As shown in FIG. 1a1, the sections 16, 22, 20, 24, and 18 span along the x-axis distances that measure, respectively, 2.53, 1.53, 2.59, 1.74, and 2.64 inches. The spans or chords along the mirror surface approximately and respectively measure, 3.44, 1.66, 2.59, 1.90, and 3.43 inches, as shown in FIG. 1a2. The depth of the mirror dome is 3.25 inches, as shown in FIG. 1b2.

In the same vein, and referring to FIGS. 1b1 and 1b2, the radius of curvature along the y-axis proceeds from the bottom to the top such that a first section 30 has a radius of curvature measuring 4.50 inches, a central section 28 has a radius of curvature of 6.5 inches and the top section 26 has a radius of curvature of 5.00 inches. These sections (30, 28 and 26) span, respectively, distances of 3.77, 3.50, and 2.43 along the base of the mirror (FIG. 1b2), and distances of 4.88, 3.55, and 3.51 along the mirror surface (FIG. 1b1).

It will be appreciated by one of ordinary skill in the art that these radii of curvature can be scaled up and down to create larger or smaller image sizes and their proportional, i.e. relative sizes, adjusted to a degree, without altering the purposes and functions of the various primary sections of the mirror, e.g., the bottom right, bottom left, center, upper right and upper left areas.

Turning to FIG. 2, it will be seen that a mirror lens 10 of FIGS. 1, 1a1 and 1b1 produces an enlarged mirror coverage space 32, i.e., field of view 32, in front of the bus 36 relative to a mirror lens that is mounted at the right hand side of the bus (as viewed by the driver). The field of view along the front of the bus is expanded, while the field of view 34 alongside the right side of the bus, which comprises the student loading and unloading danger zone, is also expanded.

The versatility of the asymmetrical lens design of the present invention can be seen when certain parameters are changed. Referring to FIGS. 3, 3a and 3b, the radius of the original revolving profile has been reduced, allowing for a smaller mirror dome footprint with benefits such as reduced size image reflections from the upper, less important portions of the mirror, a lower wind drag coefficient, smaller blind spot size (behind the mirror) and other advantages previously mentioned. Although not shown, the mirror of this embodiment may also include sections of changing curvature.

Referring to FIGS. 3, 3a1, 3a2, 3b1, and 3b2, the width of the mirror lens 40 along the x-axis is now 11.29 inches, with a right hand side section measuring 5.81 inches and a left hand side section measuring 5.47 inches. The three depicted sections 42, 44, 46 from left to right, measure (along the base in FIG. 3a1) 3.54, 3.86, and 3.89 inches, respectively. The section spans along the mirror surface are 4.56, 3.84, and 4.82 inches, respectively.

Height-wise (y-axis), however, the mirror lens size is reduced to 7.69 inches, with the curvature along the top section 48 reduced from a constant radius of 5 inches in FIG. 1, to a curvature radius of 3 inches in FIG. 3b1. The radius at the central section 50 is 6.5 inches and at the bottom section 52, 4.5 inches. The curvature spans, from bottom to top, are 3.82, 1.00 and 2.87 inches, measured along the base. Along the actual mirror surface, these spans are 4.99, 1.00; and 4.33 inches, as shown in FIG. 3b1. In general, the dimensional values of the radii of curvature and mirror sizes may be assumed to be individually and proportionately subject to variations on the order of about ten percent or even twenty percent.

Comparing the lens of the present disclosure with prior art lenses of similar size, for example, to oval prior art lenses (which have mirror lens profiles that are symmetrical relative to the y- and x-axes), the improved fields of view can be visually discerned as described below.

Figure 4A:
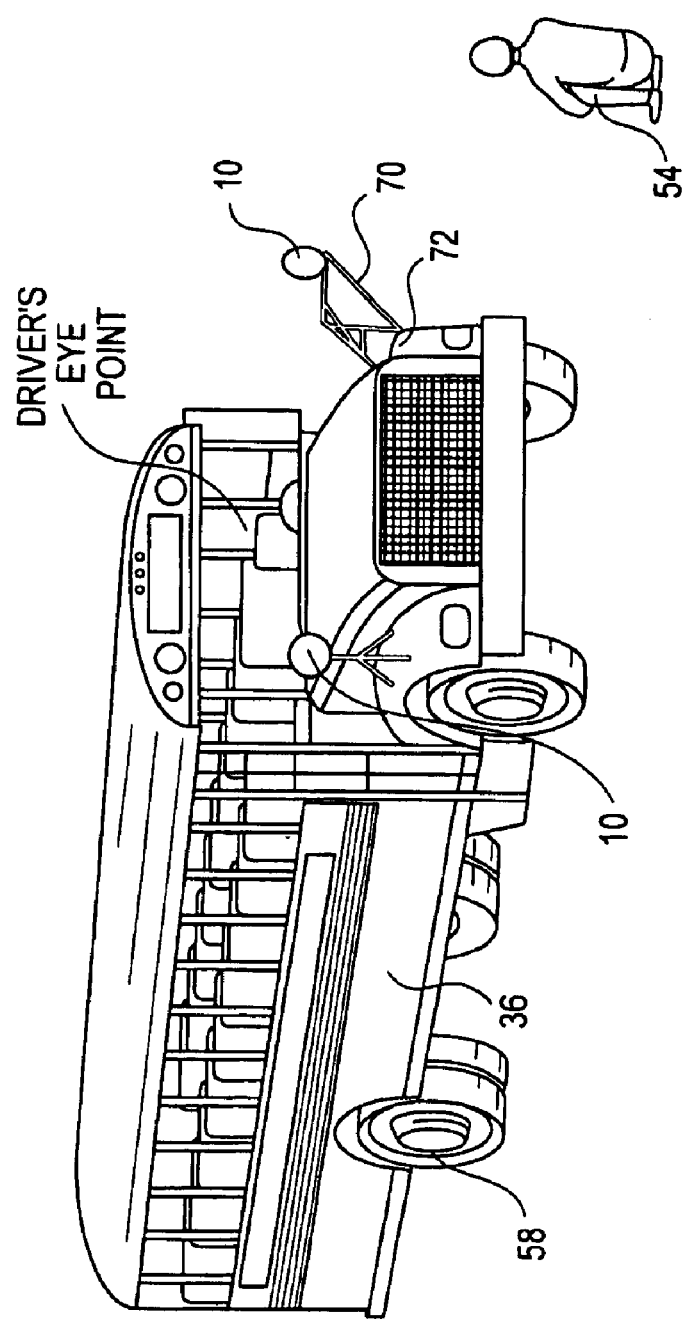
FIG. 4A is a perspective of a school bus showing a pair of cross-view mirrors mounted thereon and objects to be viewed.

Thus, as shown in FIG. 4A, two passengers 54, 56 are located in the vicinity of a school bus; with one person 56 standing in the passenger loading/unloading danger zone, aligned with the rear wheel axle 58; and another person 54 crouching in the crossing danger zone, aligned with the long axis of the bus.

Figure 4B:
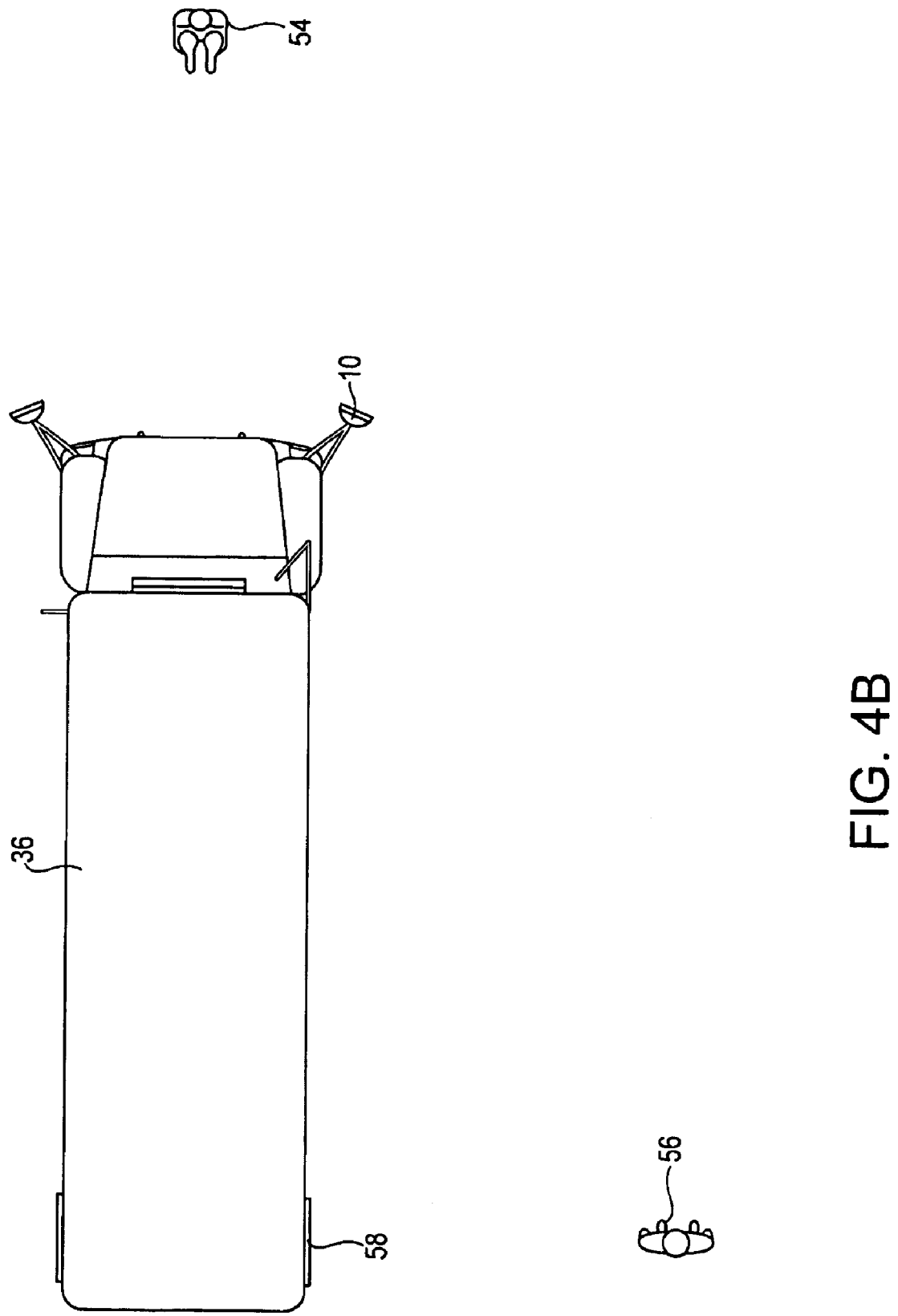
FIG. 4B is a top view of FIG. 4A.
Figure 4C:
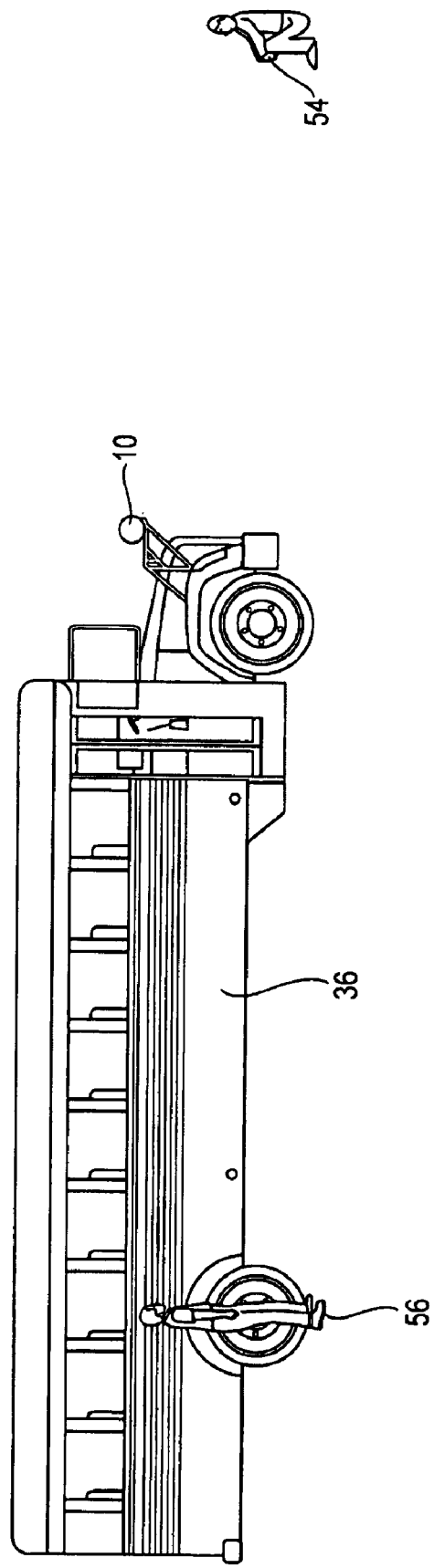
FIG. 4C is a side view of FIG. 4A.

These passenger locations outside the bus are illustrated in FIG. 4B from a top view of a bus. The same view is shown as a side view in FIG. 4C.

In the illustration of FIG. 5, prior art and present cross-view mirror images are placed approximately in the same location with respect to the driver's eye point. FIG. 5 shows (simulated) images produced by the mirror lens, in which the reflections of the objects (children) in front of and alongside of the bus have a definition and size which surpasses those achieved with the prior art, while using a mirror footprint that is comparable to the prior art. Thus, the corresponding images 62 and 64 for prior art mirror lens 60, are compared to the corresponding larger and better defined images 66 and 68 of the mirror lens 10 of the present invention.

In a further embodiment of the invention, the radii of curvature arrangement on the mirror lens can be reversed relative to the y-axis, to create a lens for the left side of the school bus, nearer the driver. That is, in the lens previously described, images of a person standing in front of the bus are seen on the left side of the mirror and those standing alongside of the bus appear in the right hand side of the mirror. For a comparable lens placed on the left side of the bus, the locations of the persons would be reversed and, therefore, so are the mirror's different radii of curvature sections.

Figure 6:
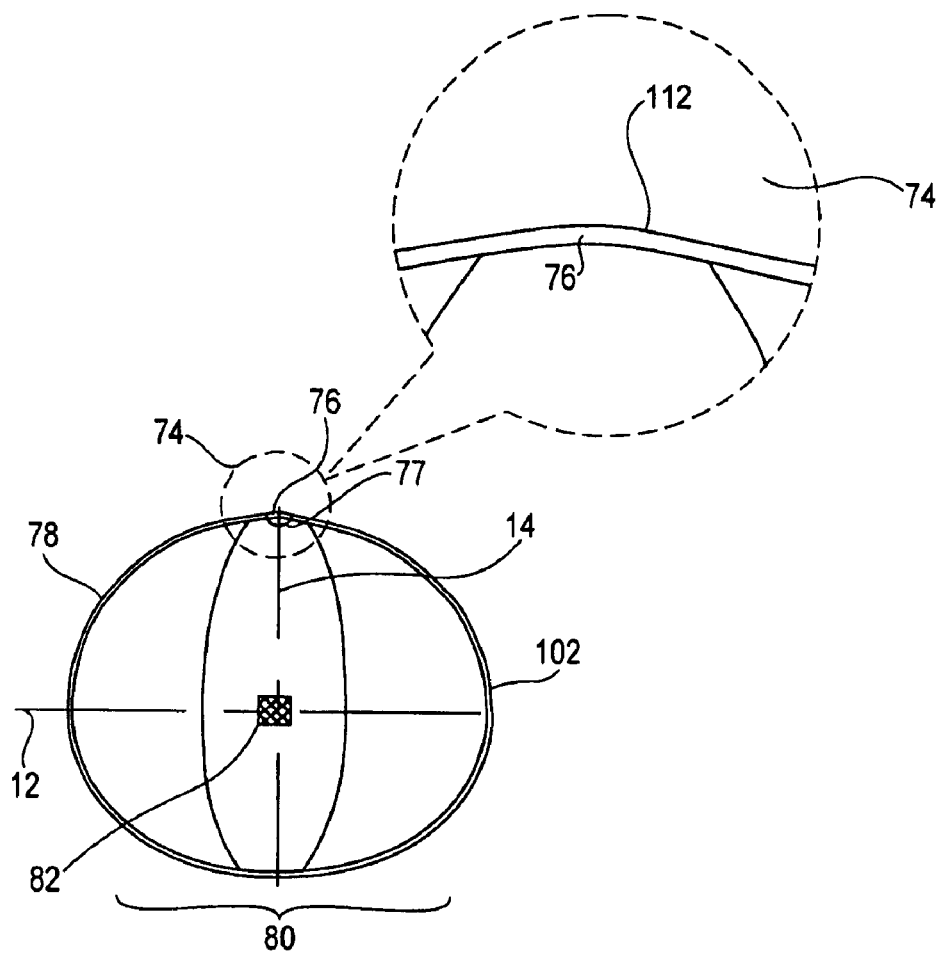
FIG. 6 identifies the peak and apogee on the mirror surface of the mirror of FIG. 1.
Figure 8:
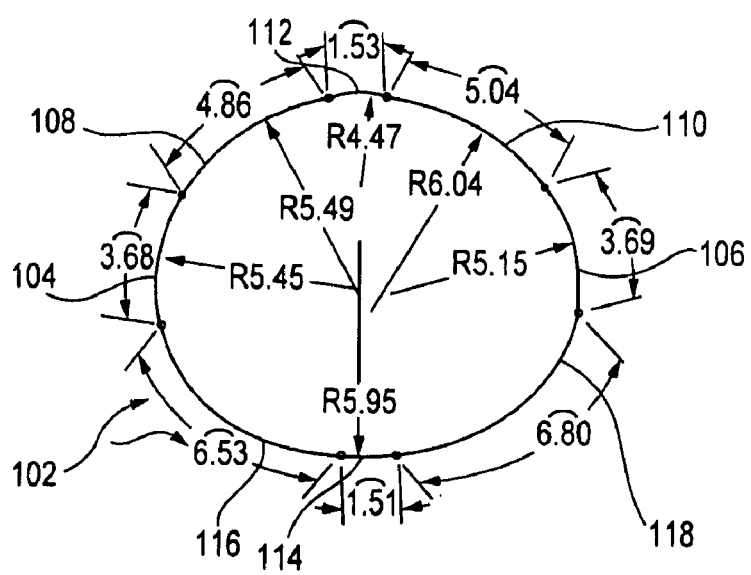
FIG. 8 shows the base perimeter of the mirror of FIG. 1, with the nature of curvature profile thereof.

Further characteristics of the mirror lens 10 in FIG. 1 can be discerned from FIGS. 6 and 8, as follows. The mirror lens has a peripheral edge 102, which lies in a flat plane with a first portion of the edge lying above the x-axis 12 and another portion below the x-axis. A peak section 76 of the peripheral edge 102 extends over a chord or curve of about 1.53 inches and has a constant radius of 4.47 inches along a peripheral edge section 112, as shown in FIG. 8. This section defines the "peak" or apogee of the base of the mirror lens 10. This peak can be marked with a small dab of paint or by having a very dark tinting 77 applied to it, as shown in FIG. 6.

The apex 82 of the mirror is at the cross section of the x- and y-axes 12, 14 and similarly can be marked by an extra dark tinting or by a circle or square of dark paint. The markings 77 and 82 provide a vertical reference, which allows a driver or a mirror installer to ascertain visually that the mirror is horizontally aligned to maximize the image sizes. The peak of the mirror can be seen in the enlarged section 74 in FIG. 6. In general, the shape of peripheral edge at the section 78 above the axis, is more pointed or sharply curved, as compared to the bottom section of the base, which has a more squat or flatter section 80, as shown.

Turning to FIG. 8, the peripheral edge can be described as having six sections of constant radii of curvature and two sections characterized by a curvature which can be defined as being quadratic Bezier curves, know, per se, to those skilled in the art. As further shown in FIG. 8, the six constant radii of curvature sections include sections 104 and 106, having respective radii of curvature of 5.45 inches and 5.15 inches and arc lengths of 3.68 inches and 3.69 inches, respectively. Constant radius sections 108 and 110 have respective constant radii of curvature of 5.49 inches and 6.04 inches, and respective arc length of 4.86 inches and 5.04 inches. As previously described, the peak section 112 has a constant radius of curvature, which is the sharpest, namely 4.47 inches and an arc length of about 1.53 inches. The last constant radius of curvature section 114 has a constant radius of curvature of 5.95 inches and an arc length of 1.51 inches. Joining the constant radii of curvature sections 104 and 114, is a first quadratic Bezier curve 116, which extends over an arc length of 6.53 inches. A second quadratic Bezier curve 118 joins the sections 106 and 114 and has an arc length of 6.80 inches, as shown. In the foregoing description, it should be recognized that the numerical values given are merely nominal and that the same can be adjusted and/or scaled individually and/or proportionately at least by an amount of plus or minus ten or even twenty percent.

Figure 7:
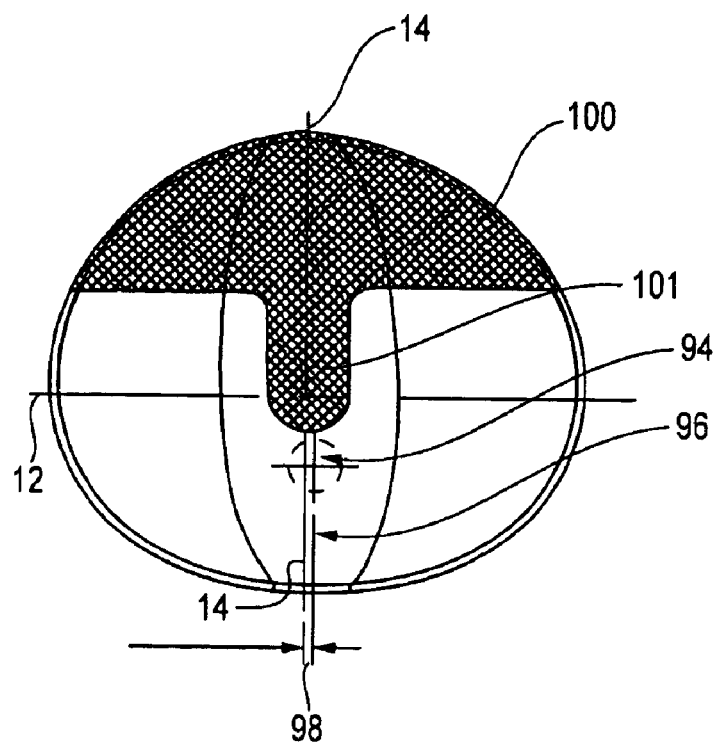
FIG. 7 shows regions on the mirror of FIG. 1 where tinting has been applied.

As shown in FIG. 7, the approximately one-third section above the x-axis 12 of the mirror can be treated with a dark tint 100, which includes a section 101 of tinting that extends down along the y-axis 14 with the upper tinting section having generally flat horizontal bottom borders. The overall shape of the this tinting allows instant visual aligning of the mirror, both horizontally and vertically, by being able to generally note the size of the tinting along the y-axis. In addition, the shape of the tinting generally covers areas on the mirror which show the horizon around the bus and the center of the bus itself, where obviously children will not be seen, as can be appreciated by viewing the images in FIG. 5. Indeed, the tinting section 101 can be more cone-shaped with the base of the cone adjoining the section 100 and the section 101 being treated with even darker tinting than the remainder of the tinted section 100.

Figure 7A:
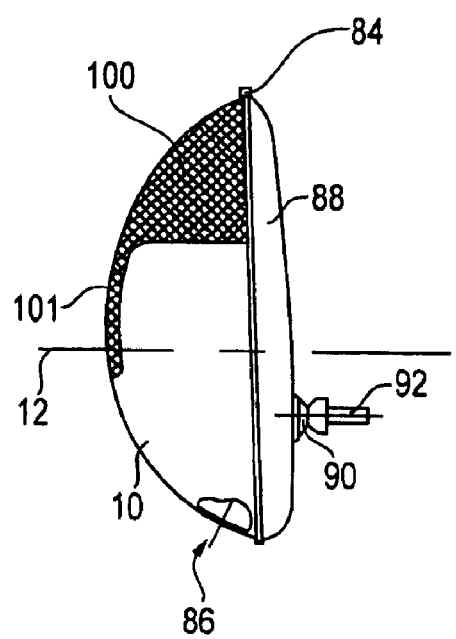
FIG. 7a is a sideview of the mirror of FIG. 7.

Referring to FIG. 7A, which shows a side view of FIG. 7, it will be noted that the mirror lens 10 is affixed at its peripheral edge to a mirror back 88, including by means of a gasket 84. The mirror back 88 has a swivel ball joint 90, which supports a stem 92 which can be connected to the arm assembly shown, for example, in FIG. 4A. A draining hole 86 is provided at the bottom of the mirror and will typically drain the mirror, particularly since the mirror is usually mounted with the top tilted away from the vertical toward the driver's eyes. The location and alignment of the stem 92 relative to the mirror back is of some import. That is, the stem (see the marking 94 shown in FIG. 7) is located slightly to the right of the x-axis 12 and about two-thirds down on the y-axis 14, along a vertical line 96 spaced away from the x-axis 14 by a distance 98. The location of the swivel provides greater flexibility in adjusting, both vertically and horizontally, the lower half of the mirror, where the most important images (of children) are expected to be viewed.

As noted, one of ordinary skill in the art will now recognize that the instant inventors have appreciated and disclosed herein the advantages which ensue from providing a mirror of constant radii of curvature which are joined and smoothly blended with one another over short distances to provide continuous and distinctive images, without suffering the distortions in images that are encountered with mirrors of the prior art that have varying radii of curvature throughout, including in the sections closer to the perimetral edges where the images of students milling about the school bus are typically observed.

Optionally, the top one-third surface of the mirror surface may be roughened or scored or otherwise treated to blur images reflected from the top of the mirror lens, so as to concentrate the driver's attention to images reflected from the ground where children might be present.

The mirror lens of the present invention has the usual flat rear support panel to which the lens is fixed by glue and a gasket which conceals the joint between the mirror back and the mirror lens. In addition, the mirror back includes a structure which can be attached to an arm assembly 70, such that the arm assembly can, in turn, be anchored in a mounting base 72 that is securely affixable to the vehicle fender, such as a school bus. See FIG. 4A.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An asymmetric convex mirror lens, comprising:
   a convex mirror lens having a peripheral edge which defines a width-wise extending axis and an height-wise extending axis and a plurality of sections of constant radius of curvature arranged width-wise along the mirror lens, including a first section having a first constant radius of curvature, located to one side relative to the height-wise axis of the mirror lens and a second section having a second constant radius of curvature which is different from the first constant radius of curvature, located to the left of the height-wise extending axis of the mirror lens,
   including a third section having a third radius of curvature located between the first and second sections and occupying a center section of the mirror lens where a cross point of the width-wise extending axis and height-wise extending axis is located, and
   wherein the third radius of curvature is a constant radius of curvature, which is smaller from the first radius of curvature and smaller than the second radius of curvature.

2. The asymmetrical mirror lens of claim 1, including a mirror back for supporting the mirror lens and a mounting stem affixed to the mirror backs and enabling the mirror lens to be adjusted vertically and horizontally, wherein the mounting stem is located below the width-wise extending axis and off the height-wise extending axis.

3. The asymmetrical mirror lens of claim 2, wherein the mounting stem is located adjacent a mid-point on that section of the height-wise extending axis which is located below the width-wise extending axis.

4. The asymmetrical mirror lens of claim 1, wherein the radius of curvature of the first section is larger than the radius of curvature of the second section, which is larger than the radius of curvature of the third section.

5. The asymmetrical mirror lens of claim 4, wherein the radii of curvature of the first, second and third sections are in the range of 10 inches, 8 inches, and 5 inches, plus or minus 20 percent.

6. An asymmetric convex mirror lens, comprising:
   a convex mirror lens having a peripheral edge which defines a width-wise extending axis and an height-wise extending axis and a plurality of sections of constant radius of curvature arranged width-wise along the mirror lens, including a first section having a first constant radius of curvature, located to one side relative to the height-wise axis of the mirror lens and a second section having a second constant radius of curvature which is different from the first constant radius of curvature, located to the left of the height-wise extending axis of the mirror lens,
   including a third section having a third radius of curvature located between the first and second sections and occupying a center section of the mirror lens where a cross point of the width-wise extending axis and height-wise extending axis is located,
   wherein the third radius of curvature is a constant radius of curvature, which differs from the first and second radii of curvature,
   including a fourth mirror lens section having a changing radius of curvature and located between the first section and the third section and including a fifth mirror lens section having a changing radius of curvature and located between the second section and the third section.

7. An asymmetric convex mirror lens, comprising:
   a convex mirror lens having a peripheral edge which defines a width-wise extending axis and an height-wise extending axis and a plurality of sections of constant radius of curvature arranged width-wise along the mirror lens, including a first section having a first constant radius of curvature, located to one side relative to the height-wise axis of the mirror lens and a second section having a second constant radius of curvature which is different from the first constant radius of curvature, located to the left of the height-wise extending axis of the mirror lens,
   wherein the mirror lens comprises a plurality of height-wise extending sections, each having a respective constant radius of curvature measured along the height-wise extending axis, and
   said height-wise extending sections including first, second and third sections of height-wise extending sections, each respectively having a different, constant radius of curvature.

8. The asymmetrical mirror lens of claim 7, wherein the radii of curvature of the first, second and third sections proceed from a bottom of the mirror lens to a peak thereof, and have values whereby the radius of curvature of the second section is larger than the radius of curvature of the third section, which is larger than the radius of curvature of the first section.

9. The asymmetrical mirror lens of claim 8, wherein the first, second and third sections have respective radii of curvature of 4.5 inches, 6.5 inches and 5.0 inches, plus or minus 20 percent.

10. The asymmetrical mirror lens of claim 7, wherein the radii of curvature of the first, second and third sections proceed from a bottom of the mirror lens to a peak thereof, and they have values whereby the radius of curvature of the second section is larger than the radius of curvature of the first section, which is larger than the radius of curvature of the third section.

11. The asymmetrical mirror lens of claim 10, wherein the first section has a radius of curvature wherein the first, second and third sections have respective radii of curvature of 4.5 inches, 6.5 inches and 3.0 inches, plus or minus 20 percent.

12. The asymmetrical mirror lens of claim 1, wherein, in addition to said first section and said second section which extend width-wise, said mirror lens includes a third, center width-wise section, a fourth width-wise extending section and a fifth width-wise extending section, such that said third width-wise section is located between and adjacent said fourth and fifth width-wise sections and said fourth and fifth width-wise extending sections are located between said first and second width-wise sections, and such that each section has a constant radius of curvature.

13. The asymmetrical mirror lens of claim 12, wherein the constant radius of curvature at the center of the mirror lens along at least one of the axes is larger than at the other sections.

14. The asymmetrical mirror lens of claim 13, wherein said larger radius of curvature is along the width-wise extending axis.

15. An asymmetric convex mirror lens, comprising:
   a convex mirror lens having a peripheral edge which defines a width-wise extending axis and an height-wise extending axis and a plurality of sections of constant radius of curvature arranged width-wise along the mirror lens, including a first section having a first constant radius of curvature, located to one side relative to the height-wise axis of the mirror lens and a second section having a second constant radius of curvature which is different from the first constant radius of curvature, located to the left of the height-wise extending axis of the mirror lens, wherein the mirror lens defines a base lying in a flat plane, and a peripheral edge of the base which is neither circular, nor oval, nor elliptical in shape, wherein the peripheral edge is comprised of curved sections, including a plurality thereof that have constant radii of curvature, wherein the plurality of curved sections include a section which includes a peak of the peripheral edge and a radius of curvature of the peak smaller than those of the plurality of curved sections having constant radii of curvature.

16. An asymmetric convex mirror lens, comprising:

a convex mirror lens having a peripheral edge which defines a width-wise extending axis and an height-wise extending axis and a plurality of sections of constant radius of curvature arranged width-wise along the mirror lens, including a first section having a first constant radius of curvature, located to one side relative to the height-wise axis of the mirror lens and a second section having a second constant radius of curvature which is different from the first constant radius of curvature, located to the left of the height-wise extending axis of the mirror lens, wherein the mirror lens defines a base lying in a flat plane, and a peripheral edge of the base which is neither circular, nor oval, nor elliptical in shape, wherein the peripheral edge is comprised of curved sections, including a plurality thereof that have constant radii of curvature, wherein the lens includes six curved sections of constant radius of curvature and two quadratic Bezier curved sections, the curved sections being tangent to each other.

* * * * *